UNITED STATES PATENT OFFICE.

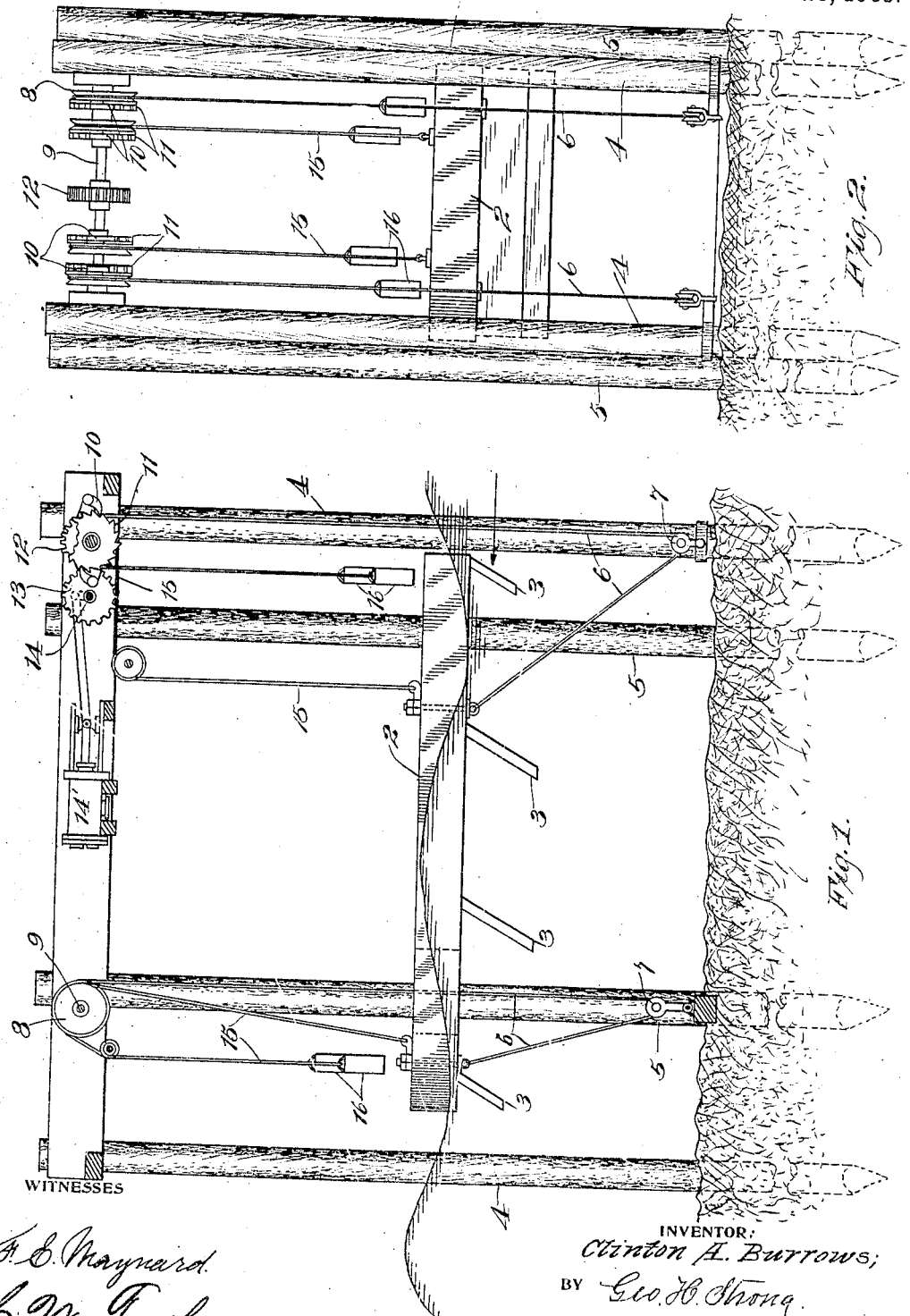

CLINTON A. BURROWS, OF LEMOORE, CALIFORNIA

WAVE-MOTOR.

No. 913,467.　　　　Specification of Letters Patent.　　　Patented Feb. 23, 1909.

Application filed June 15, 1908. Serial No. 438,606.

*To all whom it may concern:*

Be it known that I, CLINTON A. BURROWS, citizen of the United States, residing at Lemoore, in the county of Kings and State of California, have invented new and useful Improvements in Wave-Motors, of which the following is a specification.

My invention relates to motors of the class designed to convert the forces of wave and tidal water actions, into mechanical power.

It is the purpose of this invention to provide a motor of few parts and great strength.

A further purpose is to provide a structure that will convert the several distinct and combined water motions into a rotary action, to be utilized as may be desired.

The invention comprehends details of construction and the combination of elements, which will be clearly explained by reference to the accompanying drawings, in which—

Figure 1 is a side elevation of the apparatus in partial section. Fig. 2 is an end view of same.

It is desired to provide a means for utilizing the force inherent in simple wave action, which force tends to raise any floating body and simultaneously propel it forward; and I have shown, at 2, in Fig. 1, a float, of any desirable construction, placed so as to have free to and fro, and up and down action.

To the bottom of the float are rigidly secured transverse flanges 3 inclined away from the front end of the float. By front end of the float is meant the end towards the approaching wave. As many of these flanges as are desired may be used, of such dimensions as the conditions may require, and, as shown, the first and last of the series may be of less depth than the intermediate ones. The flanges perform the important function of resisting the tendency of a wave to simply lift the float and glide under; and being inclined rearwardly offer a wedge-like surface to the water, and thereby lift the float a considerably greater amount than would be the case were they not used. An advantage gained by the use of the fins or flanges is that they make the float far more active and buoyant than a float of greater depth would be, and still they offer as much, if not more, resistance than a deep float would. Piles 4, are driven firmly, surround the float in such manner as to allow free forward and backward motion of the float, and other piles 5 form side guides therefor. Cables, or any equivalent flexible connections 6 are secured, one pair forward and another pair to the rear, to the bottom of the float 2, preferably near the side edges. The forward pair of cables passes around respective underneath direction sheaves 7, swiveled low down on the piles 4 below the lowest level to which the float may drop; thence upward and over loose pulleys 8 on a suitably supported overhead shaft 9. Pawls 10 carried by the pulleys engage the ratchet wheels 11 fixed to the shaft 9. The latter has keyed to it a gear 12 meshing with gear 13 on countershaft 14 by which is driven any suitable mechanism, as an air compressor 14'. Any suitable means for rotating the shaft may be used. Other sets of cables 15 are attached to the top of the float and serve to rotate the shafts 9 in the same direction as cables 6 when the float falls, by connections similar to those just described. All of the various cables after passing around their respective pulleys 8 have secured to their free ends counter-weights 16. The rear pair of cables 6 runs downward and around the underneath direction sheaves 7 swiveled on the side piles 5, thence upward and around pulleys and coöperative mechanism similar to that mounted above the forward end. The float has both a limited oscillating and reciprocating motion, as well as an up and down motion.

It will now be seen, by my construction, that under the impulse of an incoming wave, as indicated by the arrow, the front end of the float is raised and the full force of the water is transmitted to the rotary elements by the downward pull of the cables 6; and the downward motion of the rear end of the float pulls cables 15 and rotates the rear shaft 9. The continued travel of the wave allows the forward section of the float to drop, and raises the rear end, rotating the rear shaft 9 through cable 6. Meanwhile the float may have a strong rearward motion between the guiding piles, which is transmitted through both pairs of cables 6 simultaneously.

This device utilizes all the simple motions, such as the rising and falling due to both wave and tide, and the various motions due to the combination of these; and by means of the flexible cables great freedom of action and strength is obtained.

Having thus described my invention, what I claim and desire to secure by Letters Patent is—

1. In a wave motor, the combination of a float suitably supported to rise and fall and to have a limited reciprocating and oscillatory motion, said float having inclined flanges projecting from its bottom, cables connected to the float leading around underneath direction sheaves, a drive-shaft above the float, and suitable connections between the cables and the drive-shafts for translating the various movements of the float into a rotary motion of said drive-shaft.

2. In a wave motor, the combination of a float and suitable supports therefor to permit a limited lengthwise movement and an up and down and rocking movement of the float, said float having inclined rigid underneath flanges, cables connected to the underneath portion of the float, leading thence downward underneath direction sheaves, an overhead drive-shaft to which said cables connect, and mediate connections by which the winding and unwinding of the cables operate to turn the shaft.

3. In a wave motor, the combination of a float, piles between which the float rises and falls, said float having underneath inclined rigid flanges, direction sheaves on said piles below the lowest level assumed by the bottom of the float, cables attached to the float and running around said direction pulleys, suitably supported overhead direction pulleys, an overhead drive-shaft, loose pulleys on said drive-shaft and around which said cables pass, counterweights on said cables, and ratchet drive connections between said loose pulleys and said drive-shaft to operate the latter on the movement of the float.

In testimony whereof I have hereunto set my hand in presence of two subscribing witnesses.

CLINTON A. BURROWS.

Witnesses:
R. G. SWAIN,
M. CLIFFORD.